Patented Aug. 24, 1943

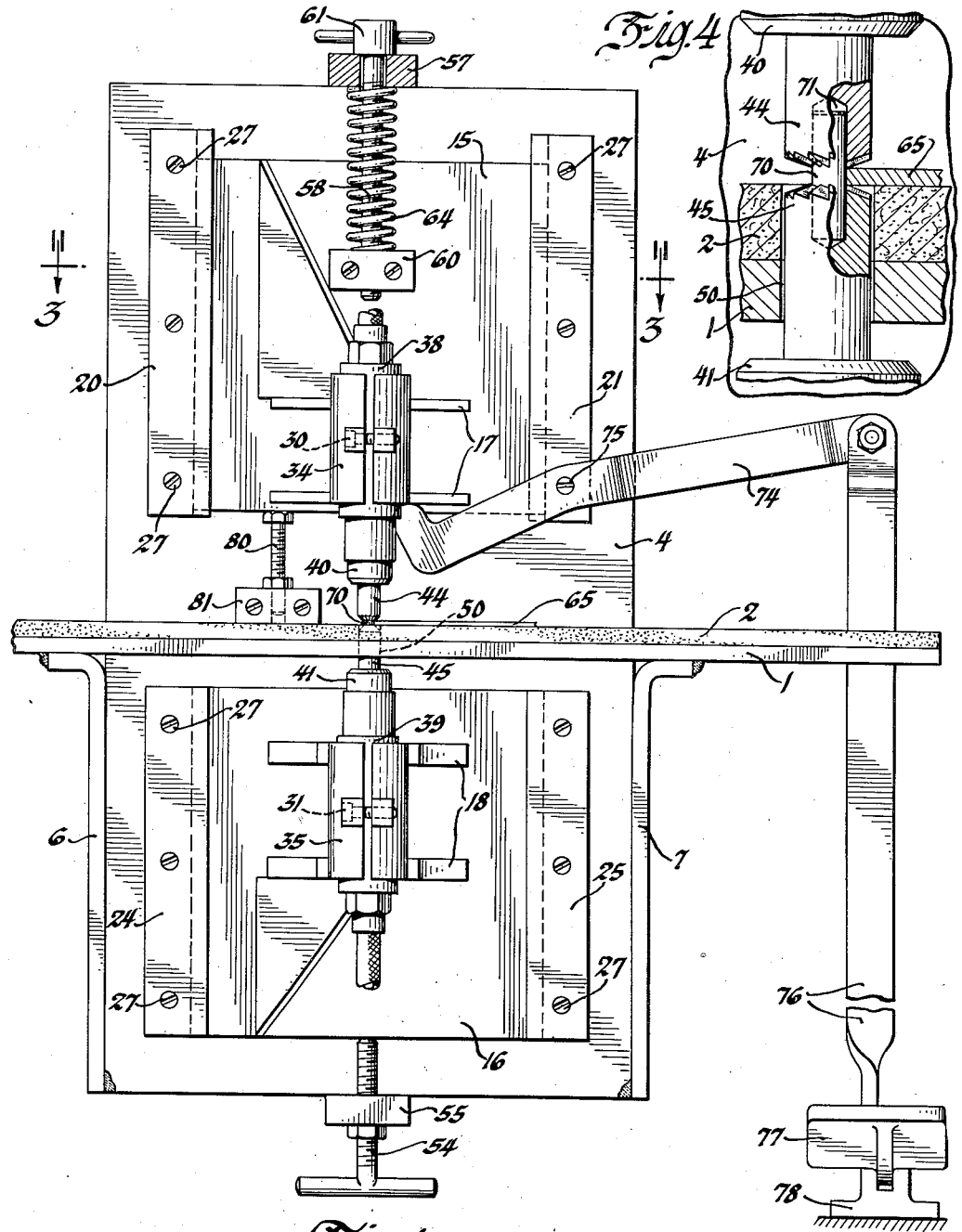

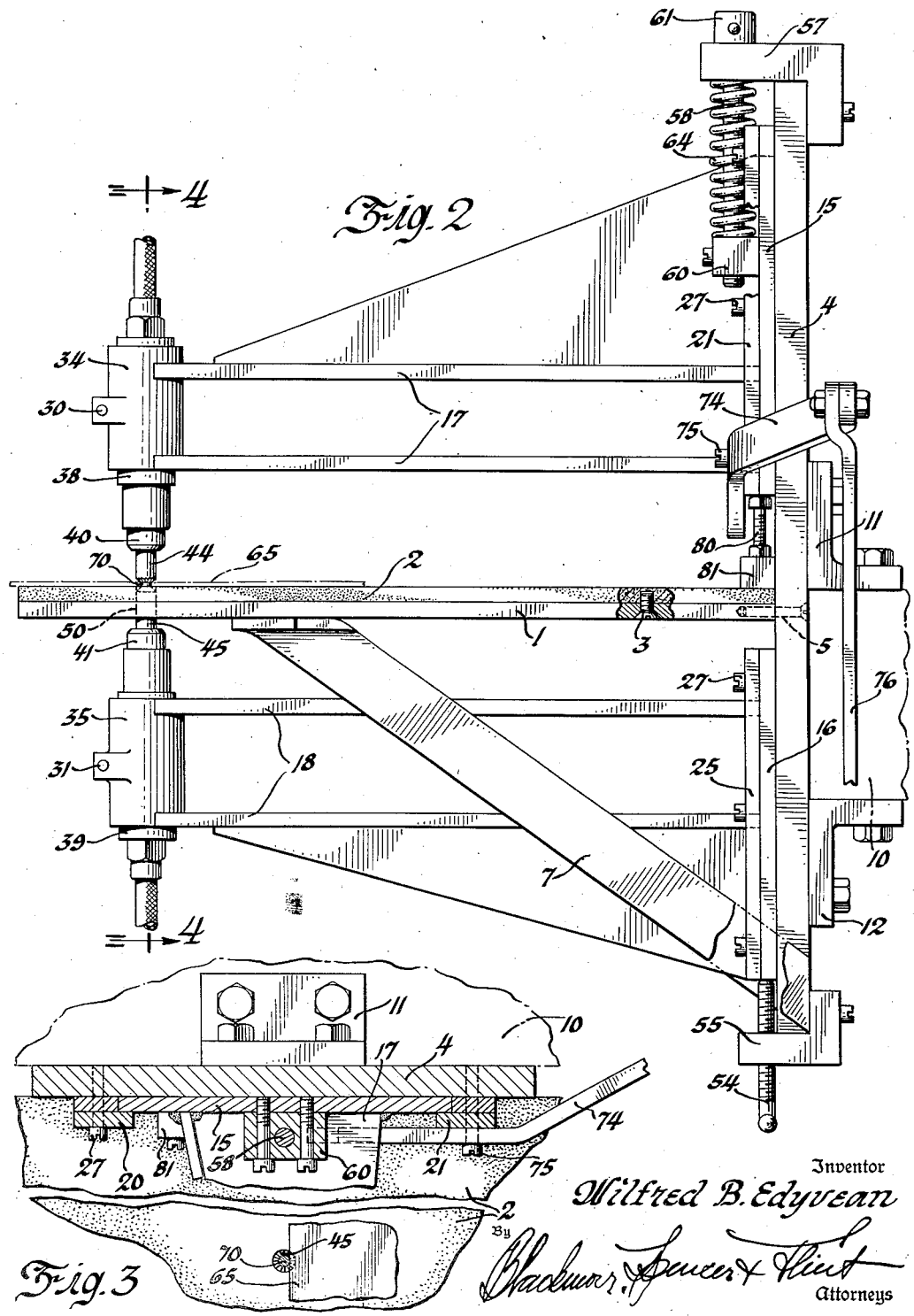

2,327,407

UNITED STATES PATENT OFFICE 2,327,407

DEBURRING MACHINE

Wilfred B. Edyvean, Detroit, Mich., assignor to General Motors Corporation, Detroit, Mich., a corporation of Delaware Application September 3, 1942, Serial No. 457,125

4 Claims. (Cl. 90—11)

This invention relates to a machine for smoothing or chamfering burred edges and particularly the edges of sheet metal.

When sheet material such as steel or aluminum, for example, is cut either to form blanks or otherwise, a small rough burr is usually produced at one or both of the edges of the sheared section. Such burred edges are obviously undesirable and have heretofore been removed by hand filing or scraping.

The object of the invention is a deburring machine with a suitable power driven tool for rapidly removing the burr from the raw edges of a blank of sheet material.

Another object of the invention is a machine which will remove and smooth the burr from both edges of a sheared section of sheet material, simultaneously.

The above and other objects of the invention will be apparent as the description proceeds.

In the drawings

Figure 1 is a view of the machine in front elevation.

Figure 2 is a view of the machine in side elevation.

Figure 3 is a sectional view on line 3—3 of Figure 1.

Figure 4 is an enlarged and partly broken away view on line 4—4 of Figure 2.

A horizontal work table 1 with a renewable composition top 2 secured thereto by screws such as 3, is secured at one end to a vertical plate 4 by screws such as 5, there being struts 6 and 7 welded to the under surface of the table 1 and the plate 4 which is secured to a work bench 10 or other suitable support by brackets 11 and 12.

Suspended above and below the table 1 from slide plates 15 and 16 respectively, are built up cantilever beams 17 and 18. The slide plates 15 and 16 are movable vertically between the plate 4 and guide rails 20, 21 and 24, 25 respectively, which are secured to the plate 4 by screws such as 27.

Rigidly clamped by bolts 30 and 31 in split sleeves 34 and 35 at the outer ends of the beams 17 and 18 are small motors 38 and 39 respectively, with their spindles 40 and 41 in vertical axial alignment.

Mounted at the ends of the spindles 40 and 41 respectively, are deburring tools 44 and 45 with convex conical ends provided with radial cutting edges of the form shown most clearly in Figure 4.

The tool 45 extends through a hole 50 in the table 1 and has its uppermost point just level with the top 2 of the table or else protruding through the hole to an extent depending on the desired extent of chamfering of the lower edge of the work piece; a position to which it can be adjusted by vertical movement of the beam 18 with its slide plate 16, by turning an adjusting screw 54 on the end of which it is supported; the screw 54 being screw threaded through a bracket 55 secured to the vertical plate 4.

The beam 17 with its slide plate 15 is suspended from a bracket 57 on the vertical plate 4 by a screw 58 which passes through a plain hole in the bracket 57 and is screw threaded in a block 60 secured to the slide plate 15.

For a reason later to be described, the slide plate 15 is resiliently held in a lower position depending on the extent to which the screw 58 is screwed through the block 60, and with the head 61 of the screw against the bracket 57, by a strong spring 64.

The aforesaid lower position of the slide plate 15 depends on the gauge or thickness of the sheet material to be deburred and the desired extent to which the upper edge of the work piece is to be chamfered, if at all; for example with a work piece 65 of the thickness shown in Figure 4, to be deburred with substantially no chamfering, the slide plate 15 could be raised or lowered by turning the screw 58 to adjust the degree of separation of the tools 44 and 45, at their closest points, to the thickness of the work piece 65; the edge of the work piece being manually fed and moved along between the revolving tools which preferably turn in opposite directions, thus self neutralizing a tendency to "feed" the work which they otherwise would have.

As shown in Figure 4, a pin 70 projects axially of the tool 45, and, when the tools are in working position, extends into an axial bore 71 in the tool 44 in which it has a running fit. The pin 70 thus helps to maintain the tools 44 and 45 in axial alignment despite side thrust of the work piece 65 and serves also as a stop which prevents overfeeding the work piece too far between the tools 44 and 45. If the edge of the work piece is held against the stop pin 70 as it is moved along between the tools, and their degree of separation is less than the thickness of the work piece, it is obvious that one or both of the upper and lower edges of the work piece will be chamfered depending on the position of the tools relatively to the table.

In order quickly to lift the tool 44 clear of the pin 70, a procedure which is necessary before a work piece having the edges of a hole to be deburred can be passed therebetween, a lever 74 fulcrumed at 75 on the plate 4 and with one end engaging the underside of the beam 17 is provided. The other end of the lever 74 is connected by a link 76 to a foot pedal 77 in a bracket 78 secured to the floor. By depressing the foot pedal 77 the assembly comprising the tool 44, the beam 17 and the slide plate 15 is quickly lifted to the requisite extent against the pressure of spring 64, which as pressure on the pedal is released promptly returns the assembly including the tool 44 to the lower working position previously described and to which it has been set by the screw 58.

In order to prevent damage to the cutters 44 or 45 which might occur if the tool 44 were to be inadvertently lowered onto the tool 45, a set screw 80 in a block 81 secured to the plate 4 is provided as an adjustable lower limit stop for the slide plate 15. It is set to stop lowering adjustment of the tool 44 below a point at which its cutting teeth are just clear of the cutting teeth of the tool 45, so that the mating tools cannot clash.

I claim:

1. A machine including a pair of axially opposed tools having convex conical cutting ends, a pin projecting axially from one of said tools into an axial bore in the other of said tools in which it has a running fit, and means for adjusting the axial distance between the closest points of the cutting edges of said tools to equal the thickness of a work piece with burred edges which is moved along between said tools and guided with its edge in contact with said pin, thereby to remove said burrs and smooth the edges of said work piece.

2. A machine including a pair of axially opposed tools having convex conical cutting ends, a pin projecting axially from one of said tools into an axial bore in the other of said tools in which it has a running fit, and means for adjusting the axial distance between the closest points of the cutting edges of said tools to less than the thickness of a work piece with burred edges which is moved along between said tools with its edge in contact with said pin, thereby to remove said burrs and chamfer the edges of said work piece.

3. A machine including a pair of vertically disposed, axially opposed tools with convex conical cutting ends, a pin projecting axially from one of said tools into an axial bore in the other of said tools in which it has a running fit, a horizontal table surrounding the lowermost of said tools, means for adjusting the position of the lowermost of said tools to a position in which the highest point of its cutting end at the periphery of the pin is flush with the top of the table, and means for adjusting the axial distance between the closest points of said cutting ends to be equal to or less than the thickness of a work piece with burred edges which is moved along between said tools and guided with its edge in contact with said pin; thereby to remove the burrs from the upper and lower edges of said work piece when the axial distance between the closest points of said cutting ends is equal to the thickness of the work piece and when the axial distance between the closest points of said cutting ends is less than the thickness of the work piece to remove the burrs from the upper and lower edges, and chamfer the upper edge thereof.

4. In combination, a pair of oppositely rotating, axially aligned, opposed tools with convex conical cutting ends, and means for adjusting the position of one of said tools relatively to the other to vary the degree of separation and distance between them, there being a pin projecting axially from one of said tools into an axial bore in the other of said tools in which it has a running fit.

WILFRED B. EDYVEAN.